US008788888B2

(12) United States Patent
Damola et al.

(10) Patent No.: US 8,788,888 B2
(45) Date of Patent: Jul. 22, 2014

(54) METHOD AND APPARATUS FOR PROVIDING END USER NOTIFICATION IN A UPNP NETWORK

(75) Inventors: Ayodele Damola, Solna (SE); Justus Petersson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 312 days.

(21) Appl. No.: 12/921,452

(22) PCT Filed: Jul. 1, 2008

(86) PCT No.: PCT/SE2008/050815
§ 371 (c)(1),
(2), (4) Date: Sep. 8, 2010

(87) PCT Pub. No.: WO2009/113932
PCT Pub. Date: Sep. 17, 2009

(65) Prior Publication Data
US 2011/0010591 A1    Jan. 13, 2011

(30) Foreign Application Priority Data
Mar. 14, 2008    (SE) ...................................... 0800609

(51) Int. Cl.
*G06F 11/00* (2006.01)
(52) U.S. Cl.
USPC ............................................. 714/57; 714/48
(58) Field of Classification Search
USPC ...................................................... 714/57, 48
See application file for complete search history.

(56) References Cited

U.S. PATENT DOCUMENTS

| 6,725,281 | B1 | 4/2004 | Zintel et al. | |
|---|---|---|---|---|
| 2002/0078161 | A1* | 6/2002 | Cheng | 709/208 |
| 2003/0101294 | A1 | 5/2003 | Saint-Hilaire et al. | |
| 2004/0165543 | A1* | 8/2004 | Nakazawa | 370/252 |
| 2004/0246992 | A1* | 12/2004 | Henry et al. | 370/467 |
| 2005/0192098 | A1* | 9/2005 | Guo et al. | 463/42 |
| 2006/0150236 | A1* | 7/2006 | Sakuda et al. | 725/135 |
| 2006/0155980 | A1* | 7/2006 | Bodlaender | 713/100 |
| 2006/0291434 | A1* | 12/2006 | Gu et al. | 370/338 |

(Continued)

OTHER PUBLICATIONS

Ritchie, J. et al. "UPnP AV Architecture:1." For UPnP Version 1.0, Status: Approved Design Document, Date: Jun. 25, 2002, Document Version: 1.00.

(Continued)

*Primary Examiner* — Chae Ko
(74) *Attorney, Agent, or Firm* — Coats & Bennett, P.L.L.C.

(57) ABSTRACT

A method of controlling a play-out of media content in a UPnP network from a control point, wherein the media content has been delivered from a media server to a remote rendering device. Upon having establishing a UPnP remote access connection between the control point and the rendering device, the control point invokes a UPnP action at the rendering device, in response to a user interaction. The control point also initiates a subscription of a state variable at the rendering device, and starts a timer, which will indicate the time that has elapsed since the initiation of the subscription. The control point will regard the UPnP action as a successful action in case it recognises a predefined state variable transition, prior to the expiry of the timeout value, ors a failed action, in case no such predefined state variable transition has been recognised upon expiry of the time out value. The result of the UPnP action is provided to the user as a notification.

19 Claims, 7 Drawing Sheets

(56) References Cited

U.S. PATENT DOCUMENTS

| | | | |
|---|---|---|---|
| 2006/0294244 A1* | 12/2006 | Naqvi et al. | 709/227 |
| 2007/0005787 A1* | 1/2007 | Igarashi et al. | 709/230 |
| 2007/0240173 A1* | 10/2007 | McCoy et al. | 719/329 |
| 2007/0260766 A1* | 11/2007 | Kim et al. | 710/15 |
| 2007/0288470 A1* | 12/2007 | Kauniskangas et al. | 707/10 |
| 2008/0050096 A1* | 2/2008 | Ryu | 386/99 |
| 2008/0159162 A1* | 7/2008 | Morikuni et al. | 370/252 |
| 2008/0177820 A1* | 7/2008 | Wada et al. | 709/201 |
| 2008/0212947 A1* | 9/2008 | Nesvadba et al. | 386/124 |
| 2008/0232405 A1* | 9/2008 | Gallo | 370/498 |
| 2008/0250151 A1* | 10/2008 | Tomita | 709/229 |
| 2008/0313531 A1* | 12/2008 | Song et al. | 715/234 |
| 2009/0024717 A1* | 1/2009 | Im | 709/218 |
| 2009/0033619 A1* | 2/2009 | Oh | 345/156 |
| 2009/0059952 A1* | 3/2009 | Kalofonos et al. | 370/465 |
| 2009/0116479 A1* | 5/2009 | Choi | 370/389 |
| 2009/0132070 A1* | 5/2009 | Ebrom et al. | 700/90 |
| 2009/0138605 A1* | 5/2009 | Handa | 709/227 |
| 2009/0177971 A1* | 7/2009 | Kim et al. | 715/739 |
| 2009/0210525 A1* | 8/2009 | Huetter et al. | 709/224 |
| 2009/0271577 A1* | 10/2009 | Campana et al. | 711/137 |
| 2010/0067872 A1* | 3/2010 | Jung et al. | 386/95 |
| 2010/0087932 A1* | 4/2010 | McCoy et al. | 700/19 |
| 2010/0250721 A1* | 9/2010 | Sohn | 709/223 |

OTHER PUBLICATIONS

Author Unknown. "UPnP Device Architecture 1.0." UPnP Forum, Document Revision Date Jul. 20, 2006. Available online at: http://upnp.org/specs/arch/UPnP-arch-DeviceArchitecture-v1.0-20060720.pdf.

Sung, J. et al. "UPnP Based Intelligent Multimedia Service Architecture for Digital Home Network." Proceedings of the 4th IEEE Workshop on Software Technologies for Future Embedded and Ubiquitous Systems and Second International Workshop on Collaborative Computing, Integration, and Assurance (SEUS-WCCIA '06), Apr. 27-28, 2006.

Kang, D.-O. et al. "UPnP AV Architectural Multimedia System with a Home Gateway Powered by the OSGi Platform." IEEE Transactions on Consumer Electronics, vol. 51, No. 1, Feb. 2005.

Belimpasakis, P., et al., "Remote Access to Universal Plug and Play (UPnP) Devices Utilizing the Atom Publishing Protocol", Third International Conference on Networking and Services (ICNS '07); IEEE, Jun. 1, 2007, XP031207510.

Buerk, L., et al., "AVTransport:1 Service Template Version 1.01", Contributing Members of the UPnP Forum, Jun. 25, 2002, pp. 5-11, XP002676690.

\* cited by examiner

METHOD AND APPARATUS FOR PROVIDING END USER NOTIFICATION IN A UPNP NETWORK

TECHNICAL FIELD

The present invention relates generally to a method and a Control point from which a user can control the play out of media content delivered from a server to a rendering device via a Universal Plug-and-Play (UPnP) network, and more specifically for providing notifications to a user, informing the user of the progress of a UPnP action that has been invoked at a remotely located rendering device from a UPnP control point.

BACKGROUND

UPnP is a framework, developed in a multi-vendor collaboration called the UPnP Forum. UPnP Forum establishes standardised device protocols, specifying a plurality of format standards and communication protocols which enables different IP devices to interact in a local network in order to perform certain tasks, such as e.g. rendering of media content, using different access technologies, operating systems, and programming languages. More details on these issues can be found in "UPnP AV architecture version 1.0", Jun. 22, 2002.

A simplified UPnP Audio/Video (AV) architecture, which enables a user to control a play out of digital media content in a UPnP network, according to the prior art, will now be schematically described with reference to FIG. 1.

FIG. 1 illustrates an exemplary content playback scenario, involving three distinct UPnP components, namely a Media Server (MS) 100, a Rendering Device, or a Media Renderer (MR) 110, and a Control Point (CP) 120, adapted for a UPnP network. These three components, each having a well-defined role in the described content playback scenario, interact in order to accomplish specific tasks, initiated from, and under supervision of, the CP 120. In the present scenario, MS 100, which may be e.g. a VCR, a CD/DVD player/jukebox, a camera, a camcorder, a PC, a set-top box (STB), a satellite receiver, or a audio tape player, contains content that a user wants to render, e.g. display and/or listen to, on a suitable MR, i.e. a device adapted to present content retrieved from MS 100, In this case MR 110. The MR 110 may be any of a TV, a HI-FI equipment, network-enabled speakers, an MP3 player, Electronic Picture Frames (EPF), a music controlled water fountain, or any other device, suitable for presentation of content in an appropriate form.

A user interacts with an application logic, or a UI application, of the CP 120 via a User Interface (UI) 121, which may be integrated with the CP 120, or configured as a separate UI, adapted to interact with CP 120. UI 121 enables the user to locate and select a desired content on MS 100, and to select an appropriate target MR 110, on which the user wants the selected content to be rendered. CP 120, which may be e.g. a TV, typically comprising a traditional remote control, a PC, a LapTop, a cellular telephone, or a wireless PDA-like device provided with a display, communicates with MS 100 and MR 110 via a Local Area Network (LAN) 130, via commands, typically standard UPnP actions, entered by the user.

MS 100 contains, or has access to, content, typically different categories of entertainment content, that is stored, either locally 101 on the MS 100, or on an external storage device 102 that is accessible from MS 100. MS 100 is able to access its content, and to transmit it to a rendering device via another network 140, operating in accordance with some type of Out-of-Band transfer protocol and a data format that is understood both by the MS 100 and the MR 110. Such a media content delivery is typically provided by executing Isochronous or Asynchronous Push or Pull.

The content exposed by MS 100 may include arbitrary types of content, including e.g. video, audio, and/or still images. MS 100 may be configured to support one or more transfer protocols and data formats for each content item. Alternatively it may be adapted to convert the format of a given content item to be delivered into another suitable format on the fly.

The type of content that a MR can receive depends on which transfer protocols that are used and on the data formats that the MR supports. Some MRs may only support a single type of content, such as e.g. video audio or still images, whereas other MRs may have been adapted to support a wide variety of different content types.

CP 120 coordinates and manages the operation of MS 100 and MR 110, as directed by a user, e.g. via commands or actions, which may be used by a user to enter or initiate typical UPnP activities, such as e.g. play, stop, pause etc., to be executed by the CP 120 for the purpose of accomplishing a desired task, e.g. to retrieve "MyFavorite" music from MS 100, and to play the retrieved music on a suitable MR, such as MR 110.

As indicated above, CP 120 typically provides a UI 121, enabling the user to control the operation of one or more available MSs, and one or more available MRs, e.g. in order to select and render desired media content. The layout of the CP's UI 121, and the functionality that it exposes, will typically be implementation dependent and, thus, determined by the manufacturer of the CP 120. According to the present UPnP standards, CP 120 allows users to use different service types (103;111) to be able to control the selected MS and MR, respectively. Service type "ContentDirectory" (CDS) enables the CP to browsers and search for content objects stored at a MS, while the service type "RenderingControl" (RCS) enables the CP to control an initiated rendering procedure, such as e.g. the volume level, when playing out content retrieved from a MS on a MR. Service type "ConnectionManager" (CM) is another service type which the CP may use towards both a MS and a MR in order to set up a connection between the CP and the respective other entity. The AVTransport (AVT) Service is another service type used by the CP 120 to control the playback of content that is associated with a specific AVTransport. This service type includes the ability to activate activities, such as e.g. Play, Stop, Pause, Seek, etc., via specific commands, depending on the supported transfer protocols and/or the data formats used. This service type defines a common model for A/V transport control, suitable for the generic user interface, i.e. UI 121. The main functionality of this service type is to gain control over the so-called "TransportState" variable of the MS.

An exemplary state machine for a MS, according to the prior art, will now be described with reference to FIG. 2, depicting different possible states (214-220) and commands or UPnP actions (201-212), which, when entered or initiated by a user, initiates an activity on the MS, and, as a consequence, a variable transition from one state to another state in the state machine. FIG. 2 specifically illustrates states, UPnP actions and variable transitions, for the "TransportState" variable. The Play( ) action 201, may for example initiate a TransportState variable transition from the state "STOPPED" 218 to the state "PLAYING" 220. In a scenario where content is being played out from a MR, the playback initiated by the Play( ) action may later be paused by the CP, transmitting the "Pause( )" action, 210 to the selected MS. The Pause( ) action 210 causes the TransportState variable to change from "PLAYING" state, 220, to "PAUSED PLAYBACK" state, 214. By later transmitting Play( ) action, 202, to the MS, the CP will be able to instruct MS to resume the play out, and, thus, the TransportState variable will again return to the "PLAYING" state 220.

In order to provide for a transfer of content between a MS and a MR, a signalling procedure between a CP, controlling the transfer, and the respective MS and MR, executed via network 130 of FIG. 1, will be necessary. A content playback scenario, as defined by the Asynchronous-pull transfer protocol in UPnP AV version 1.0, according to the prior art, will therefore now be described with reference to the signalling diagram of FIG. 3.

In FIG. 3, a transfer protocol, such as e.g. HyperText Transfer Protocol (HTTP), is used for obtaining a transfer of media content between a MS 100 and a MR 110. In this case, MR 110 performs a HTTP GET action on a URL, pointing to a content file of MS 100, as provided by CP 120.

In a first step 3:1, a user searches for content to render, e.g. by browsing the content of MS 100, typically by initiating the CDS service type, via a UI (not shown) of CP 120. In a next step 3:2, the user obtains protocol and format information in a Protocol/Format List retrieved from MR 110, using service type CM. In a subsequent step 3:3, CP 120 chooses a matching protocol and format, preparing for a future content transfer. In a next step 3:4 and a subsequent step 3:5, CP 120 uses service type CM to prepare for a connection with MS 100 and MR 110, respectively, according to the UPnP standards. In a step 3:6, CP 120 provides the URL, necessary for obtaining the required content, to MR 110, using a AVT service type, and in a subsequent step 3:7, an action, in this case the UPnP Play( ) action, is initiated from CP 120 by the user, typically via HTTP get, or in a RTSP play request.

In another step 3:8, a transport protocol is invoked, and a content file, pointed to by the retrieved URL, is transferred from MS 100 to MR 110 via a conventional Out-of-Band content transfer. In a next step 3:9, the user controls the rendering of the content from CP 120, in this case by controlling the volume, using the RCS service "SetVolume" action. In a subsequent step 3:10 the content transfer is completed, and if necessary, the procedure may be repeated, as indicated with another step 3:11.

There are mainly two critical point in the presented AV session setup. Initially, an error may occur in association with, or subsequent to, MR 110 having initiated a request for playing out the selected content from the MS 100, i.e. a Play( ) action may not have been executed correctly. Such an occasion is indicated as "1" in the figure. Secondly, an error may occur in association with the required transfer of the content, as indicated with "2" in the figure. Such an error may result in corrupt content being delivered to MR 110, or even in no transfer at all to the MR.

If the MS from which content is to be retrieved is located at a remote distance from the MR, on which the content is to be rendered, an alternative architecture, adapted for handling remote interaction between the respective entities will be necessary. Such an architecture, according to the prior art, will now be described with reference to FIG. 4.

FIG. 4 schematically describes an architecture suitable for the support of an IP Multimedia Subsystem (IMS) assisted UPnP Remote Access (RA) connection set up, which may be performed in order to handle media transfer of content between two remotely located UPnP networks. The present scenario may be defined as follows: It is close to Christmas and a son living abroad wants to share some pictures with his parents. At the same time he also wants to wish his parents a Merry Christmas and a Happy New Year. It is assumed that the son is at his home 400 abroad and that his parents presently are at their home 410, both homes having a respective local UPnP network, 401 and 411, installed. Each UPnP network 401, 411 comprises a respective Home IMS Gateway (HIGA) 402 and 412, each of which is implemented at a respective Residential Gateway (RGw) (not shown). A HIGA is a multimedia gateway that can generally emulate an IMS terminal from the local UPnP network towards an IMS network, in order to access IMS services on behalf of a device located in the local network. FIG. 4 illustrates some basic steps 4:1-4:3, which will be executed during a connection setup for an IMS assisted UPnP remote access, according to the prior art.

In a first initial step 4:1, an IMS authentication and authorization procedure of the son's HIGA 402 is performed at the parent's HIGA 412, via an IMS network 420, here represented by network node 421. In a next step 4:2, a Virtual Private Network (VPN) set-up is performed between the two HIGAs 402 and 412, in order to provide for a secure transfer of content between the two local networks. Once the two initial steps have been successfully performed, a Digital Living Network Alliance (DLNA) media delivery may be executed from a MS 100, located at the home 400 of the son, to a MR 110, located in the parents home network 411, via the VPN connection. This is indicated with a step 4:3. MR 110 may be e.g. a TV/STB, a Picture Frame through a laptop, or a mobile device, which is adapted to act as a WIFI SIP/DLNA client behind HIGA 412.

A UPnP CP 120, typically controlled by a user via a UPnP remote access client 403, make up the requesting end point at the son's home network 401. The UPnP CP/UPnP remote access client 403 could reside either in a fixed Customer Premises Equipment (CPE) device, e.g. a HIGA in a RGw, in a mobile terminal, or be distributed between a mobile device 403 and a RGw 120, as shown in FIG. 4.

In a scenario, where the CP and the MR involved in a content transfer are located close to each other, the user that has activated an action via the CP will in most cases easily be able to inspect the MR visually during the complete transfer process, and, thus, the user will thereby also be able to verify that an initiated transferring procedure is executed as expected, or if that is not the case, the user usually will be aware of that, and, thus, he will also be able to make a decision to make another try or to start to identify the reason for the unsuccessful attempt, without any further delay.

However, in a scenario where a UPnP CP requests a media asset, such as e.g. a video stream or a picture, to be played on a MR, e.g. a media player, residing at a remote location, e.g. as described in the previous example, the user that initiated the content delivery will be unaware of whether the media asset has successfully started playing at the remotely located media player, or if some problem with the play out has occurred in the remote media player sometimes during the delivery of the content.

SUMMARY

It is an object of the present invention to address at least some of the problems mentioned above. According to one aspect, a method is provided for controlling a play-out of media content, delivered from a media server to a remote rendering device via a UPnP network. Once the control point has established a UPnP remote access connection between the control point and the rendering device, a UPnP action can be invoked at the rendering device from the control point. In order to allow a user, handling the control point, to be aware of the result of the UPnP action a subscription of a state variable at the rendering device is initiated at the control point. A timer, which will indicate the time that has elapsed since the initiation of the subscription, is also started at the control point. The timer is set to an appropriate time out value, typically chosen as a multiple of the RTT, i.e. 4*RTT, between the control point and the rendering device. The control point is configured to consider the UPnP action as successful, in case a predefined state variable transition is recognised prior to the expiry of the time out value of the timer, or to consider the UPnP action as failed, in case the predefined state variable transition has not been recognised upon expiry of the time out value of the timer. Once a relevant variable transition has been recognised, or the time out value has expired without having recognised any relevant variable transition, the control point provides a notification of the result of the UPnP action to a UI, typically a GUI, which may be integrated with the control point, or configured as a separate UI. The notification may be e.g. an audio code, an audio message, a graphical symbol or a text message, depending on the configuration of the control point and the form of UI.

The connection between the media server and the rendering device is typically provided via the IMS/SIP protocol, while the media content delivery is typically achieved via a VPN connection.

If the control point has obtained a value for the RTT between the control point and the rendering device prior to starting the timer, this information may be used for determining the time out value, e.g. to a multiple of the RTT.

The claimed invention also refers to a control point, adapted to execute the method described above.

The suggested notification mechanism makes it easier for a user to execute remote UPnP deliveries of media content, since notifications will make the user aware of the progress and outcome of each initiated delivery. The notification mechanism also rely on a robust procedure, which will be easy for the control point to initiate each time a request for a media content delivery has been initiated by a user.

BRIEF DESCRIPTION OF THE DRAWINGS

The present invention will now be described in more detail by means of exemplary embodiments and with reference to the accompanying drawings, in which.

DETAILED DESCRIPTION

The present invention enables a user to determine whether a content play-out, initiated by the user on a remotely located media rendering device, has been successfully completed or not. Such a determination may not be a problem in a UPnP AV architecture where the rendering device is in close proximity to the user and the control point, from which the user is controlling the play-out, because the user is normally able to perform a visual confirmation that the requested media asset is indeed being played out on the selected rendering device, or in case of a failure, the user will be aware of that more or less instantly. This will, however, not be when the different devices are distributed at a considerable distance.

Usually, when a CP, MS and the MR, operating as the media player, are located in the same local network, the initiating of a play out action and the result of the initiated action is almost instantaneous. However, when the media player is located at a remote location, a delay, specified as a time out value is introduced. Therefore the idea of using a timer in the CP, to take into account possible network delays during the play-out, is suggested.

Figure 3:
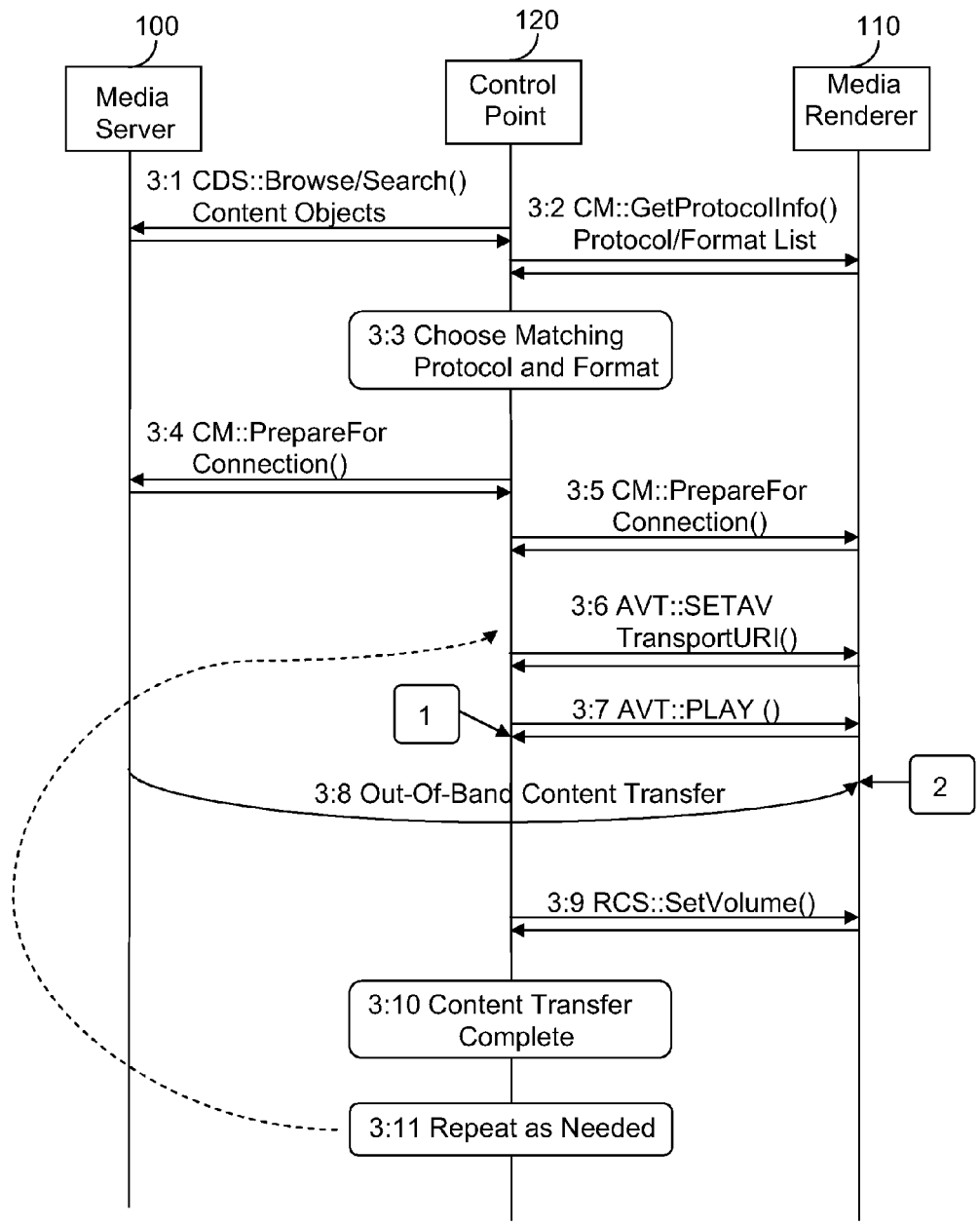
FIG. 3 is a signalling diagram, illustrating signalling and a content transfer, using an asynchronous pull transfer protocol, according to the prior art.
Figure 4:
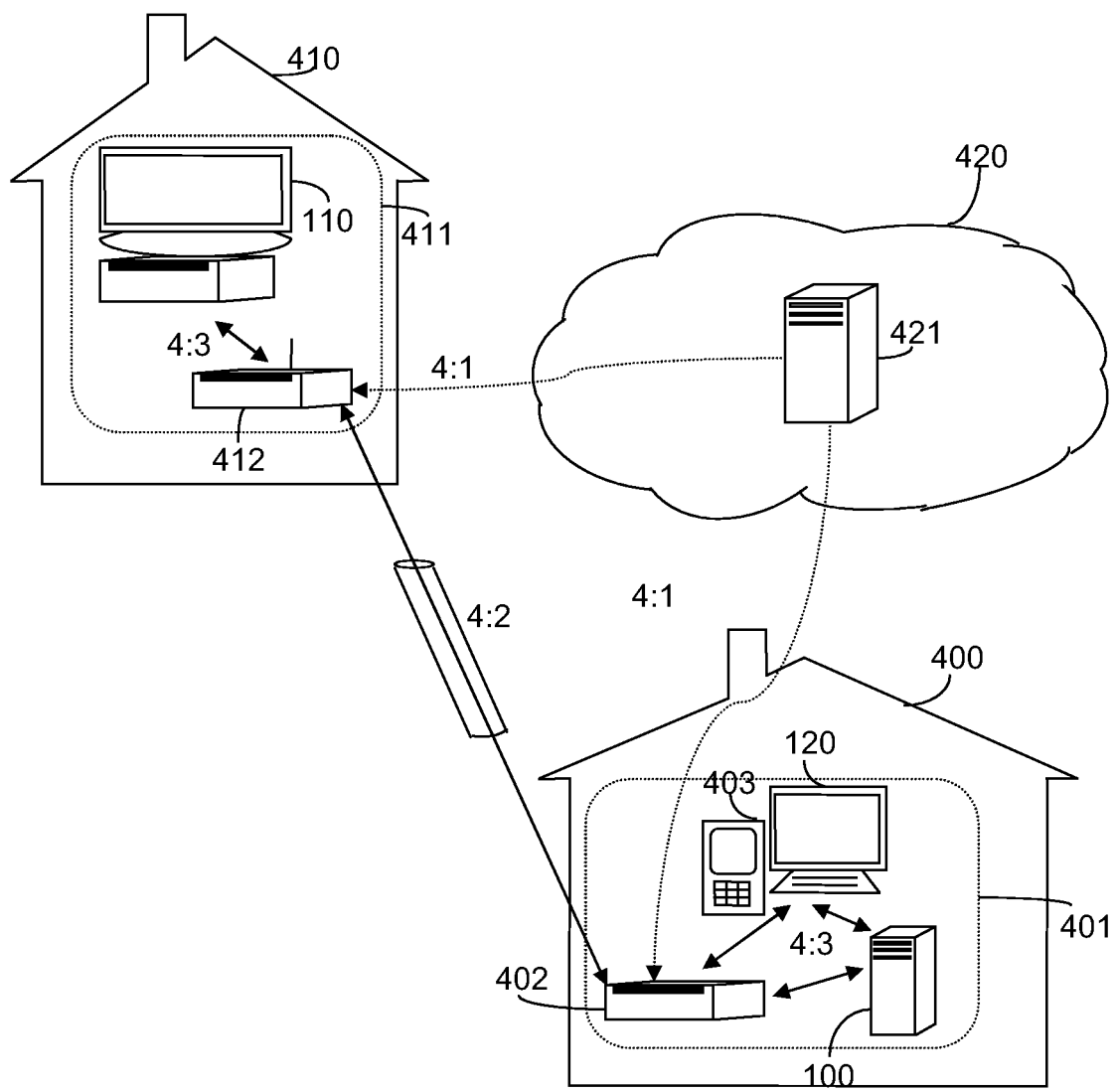
FIG. 4 is an architecture, illustrating an IMS assisted UPnP remote access connection set-up, according to the prior art.

Points 1 and 2 in FIG. 3 show two critical time instances in a typical AV session set-up procedure, where a connection problem typically could arise, and where, in case of a problem, it would be appreciated if a user would be notified of such a situation.

In a so-called "2-box model", i.e. in an architecture comprising a combined MS/CP, or a "3-box model", i.e. where separate MSs and CPs are used, and where a user has selected content for remote play-out at a MR, a timer, set to an appropriate time out value, is started at the CP, subsequent to the CP having initiated an action, such as e.g. a play-out action, and a subscription for a suitable state variable of the MR.

If, after the time out value, T, specified for the timer, has elapsed, the value of the subscribed state variable of the remote target device has not changed to a specific state, e.g. the "Playing" state, it is inferred at the CP that the remote rendering device is not displaying the requested media content properly, and, consequently, the user will be notified that a problem with the play-out has occurred.

Network problems, such as e.g. network congestion and/or server problems, can be determined by continuously checking the value of the subscribed state variable from the control point, or more specifically, the control point will be able to recognise if one or more specific transitions of a state variable, such as e.g. the AVTransport service variable "TransportState" occurs.

Figure 5:
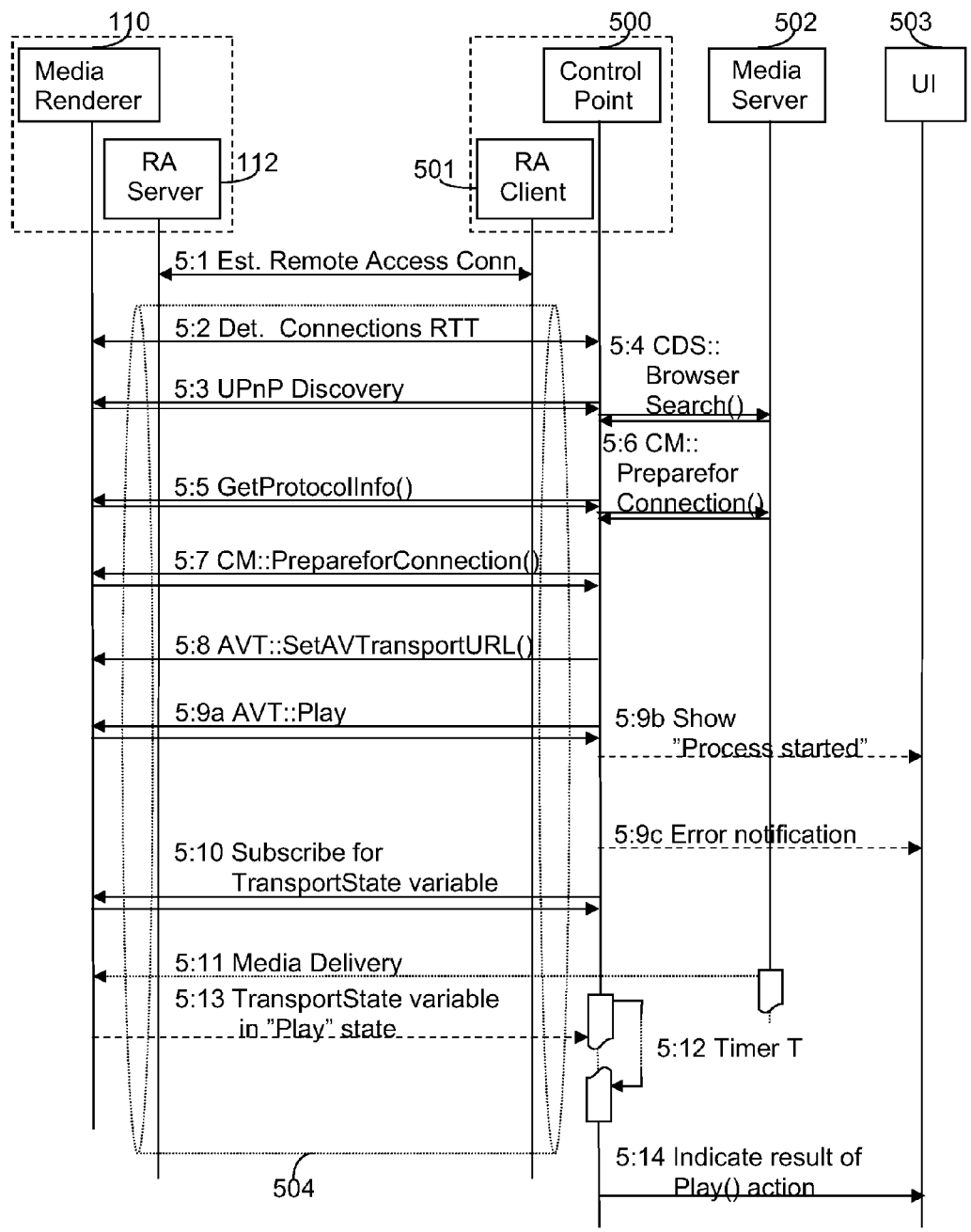
FIG. 5 is a signalling diagram, illustrating a procedure for notifying a user during a remote access AV set-up, according to one exemplary embodiment.

FIG. 5 is a signalling diagram, illustrating how a notification mechanism can be implemented into a remote access AV setup procedure, according to one embodiment. The mechanism will enable a user to become aware of the progress of a selected action in a user friendly way.

According to FIG. 5, a user, is provided with a remote UPnP CP 500, and an associated UPnP Remote Access (RA) client 501, which may be integrated with the CP 500, or configured as a stand alone device. The user obtains content from a MS, or a Home Server, 502, which may be placed locally, in close vicinity to the CP 500, or at a distributed location. The user is also provided with a User Interface (UI) 503, which in its simplest form may comprise one or more loudspeakers, for providing audio coded messages. Alternatively, the UI may be a Graphic UI (GUI), providing graphic information to the user e.g. in plain text or symbols, or as a combination thereof. Although illustrated as a separate entity in the figure, it is to be understood that, alternatively, UI 503 may be integrated with CP 500, as mentioned previously in this document. The user may use CP 500, to select and deliver content to a MR 110, comprising a standards compliant RA server 112. In resemblance to the CP 500, also MR 110 and the RA server 112 may be configured as one single device, or as two separate, interconnected devices.

In a first step 5:1, A UPnP remote access connection is established between RA server 112 and RA client 501, according to the standardised "UPnP remote access architecture, version 0.82, 2007, or any other suitable method, which is adapted to enable UPnP traffic pass-through. This procedure results in a VPN 504 being established between RA server 112 of MR 110 and RA client 501 of CP 500.

Upon having established VPN 504, the Round Trip Time (RTT) is measured between the two UPnP networks (not shown), where CP 500 and MR 110, reside. The RTT may be measured, using any conventional RTT measuring method. Such a procedure is indicated with another step 5:2. Alternatively, the RTT may have been determined and stored in advance in a storage unit, from where this value is obtained when required. The value of the RTT will be used at a later stage to consider the expected maximum delay in the communication between CP 500 and MR 500, before it has to be determined whether a media content transfer has succeeded or failed. Since the RTT is dependent on the present conditions of the network, a stored RTT may give an inappropriate indication of the present RTT, and, thus, a calculation of the RTT at this stage is in most cases preferable. Under some circumstances, however, i.e. for a content delivery over a stable connection that has been established for a long time, a previously retrieved RTT may be a value which is reliable enough.

In a subsequent step 5:3 CP 500 performs an UPnP discovery in order to locate MR 110. Such a procedure may e.g. be executed according to "UPnP device architecture", v1.9, 2006, or in another comparable way. In a next step 5:4, the user access MS 502 in order to select some AV content that is to be transmitted from MS 502 to MR 110, via the VPN connection.

At this stage, CP 500 performs preparations necessary for an upcoming communication between the CP and MR 110, as indicated with steps 5:5-5:8. These steps are executed according to either the 2-box model, or, as in the figure, the 3-box model, and well known UPnP standards.

In a next step 5:9a, the user invokes a play-out action, typically by invoking a UPnP Play( ) action via a UI of CP 500. From a usability point of view, it is desirable to inform the user that the process of the play-out on the remote MR 110 has started at this stage. For this reason, an optional step 5:9b, having the purpose of informing the user via UI 503 that the play-out has started, may be executed. Such a notification may be provided to the user e.g. in the form of a progress bar or the like, or simply as a text message, informing the user of the present event.

According to yet another optional step, CP 500 may be adapted to deliver an error notification to UI 503, in case the invoked action results in a failure at MR 110, and in case a relevant error code, indicating the respective error cause, is transmitted to CP 500 in response to the action, initiated at CP 500. Such an optional procedure is illustrated with another step 5:9c. The exact reason of a failure of a play-out action could be notified via standardised error codes, e.g. as defined in "UPnP AVTransport Service Specification", v2, May 31, 2006. According to this specification, codes 400-499; 500-599; 600-699; 701-725 indicate "No content", "Transport is locked", "DRM error" and "Expired content", respectively.

If, however, the invoked action does not result in the returning of an error code, CP 500 will continue the suggested notification procedure by automatically initiating a monitoring procedure, having the purpose of monitoring the transitions of a specific state variable, associated with an action at MR 110. Such a monitoring will continue until the action is expected to have been successfully executed, or until the time out value of a timer expires. The result of the calculation of the RTT, executed or retrieved in step 5:2, will serve as a reliable reference for the timer. By subscribing for a continuous update of the present state of a state variable from MR 110, so that CP 500 is notified if a specific transition occurs for that variable, CP 500 will become aware of the progress of the invoked action, such as e.g. when a play-out is actually starting at MR 110.

Figure 1:
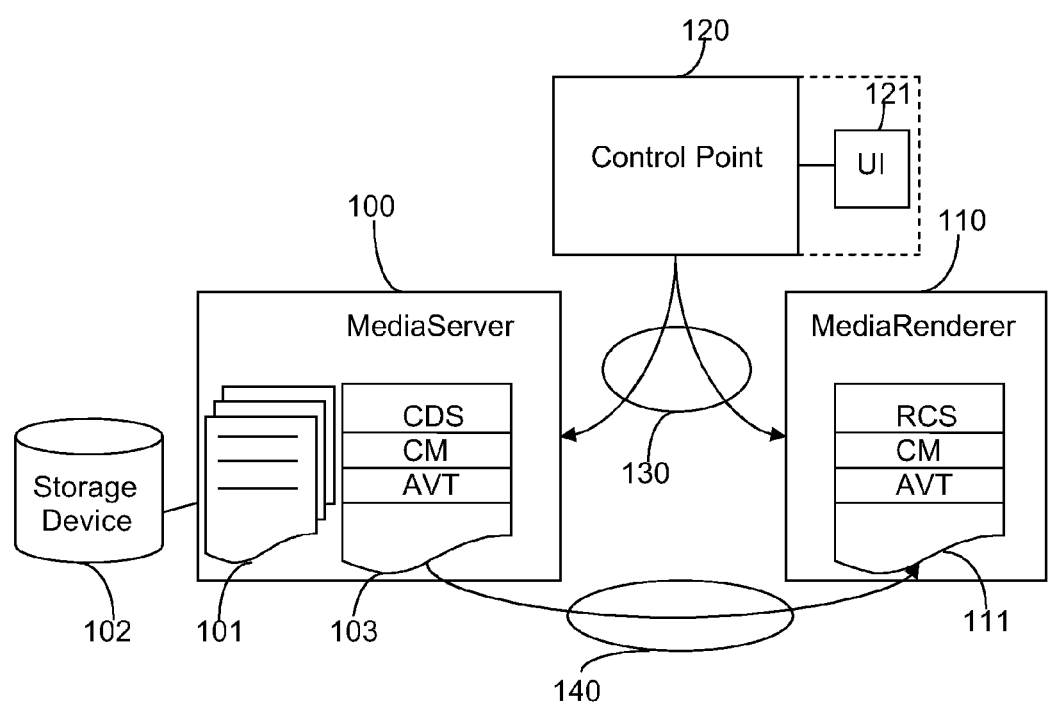
FIG. 1 is a basic overview of a UPnP architecture, according to the prior art.
Figure 2:
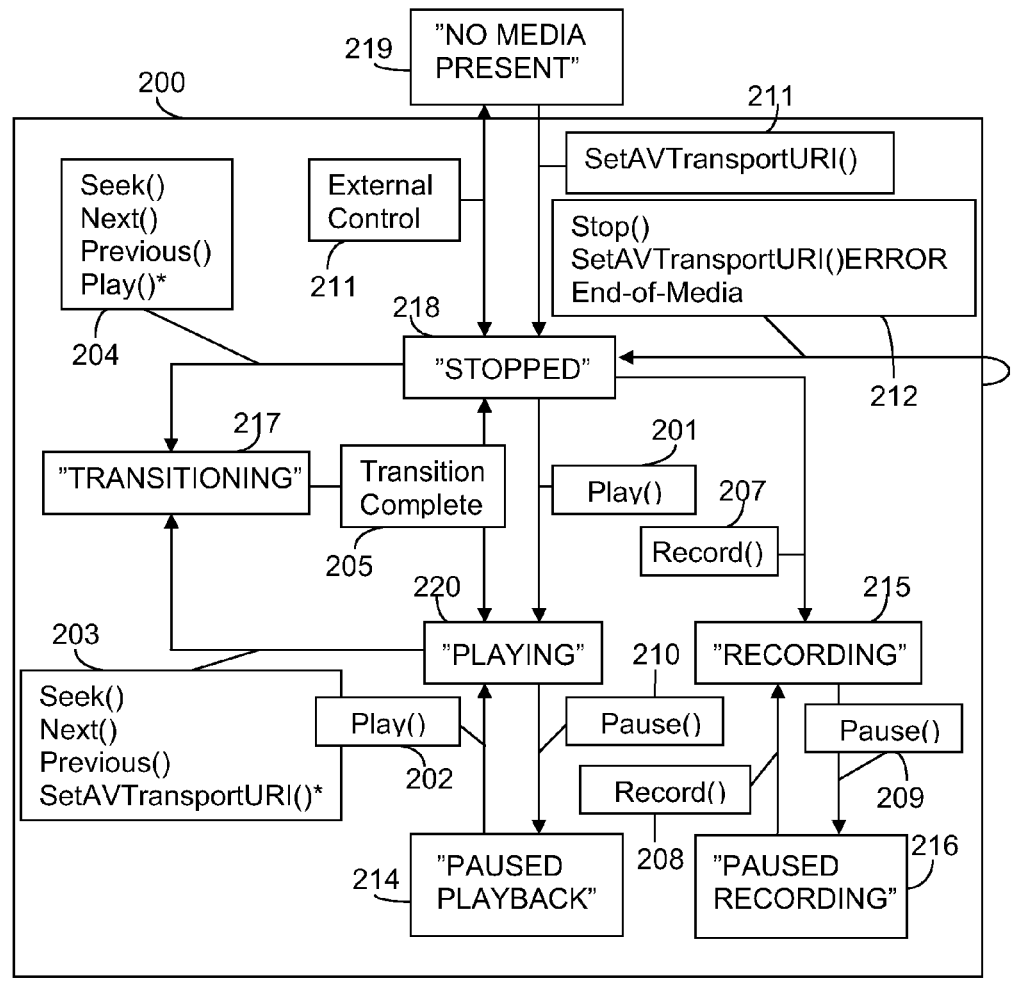
FIG. 2 is a basic overview of a state machine of a media server and possible TransportState variable transitions, according to the prior art.

According to this embodiment, CP 500 therefore subscribes to the standardised "TransportState" variable, at MR 110, as indicated with a next step 5:10. This variable may take a set of different values, in accordance with the state machine and the transition diagram of FIG. 2. The state of interest for CP 500 will typically be the "Playing" state, i.e. a transition to the "Playing" state will be an indication to the user that a media content play out has started. According to the present embodiment, the user will therefore be notified via UI 503 once this state has been attained at MR 110. The media content is delivered from MS 502 to MR 110 in a step 5:11, which may occur at any time subsequent to step 5:9a.

Subsequent to the subscription for the TransportState variable has been initiated in step 5:10, a timer, having a predetermined time-out interval T, is started at CP 500, as indicated with another step 5:12. The purpose of this timer is to specify a specific wait period, after which it is assumed by the logic of CP 500 that the play-out action was not successfully executed on MR 110, i.e. the play-out action has not resulted in a TransportState variable transitioning to the "Playing" state, in case no expected variable transition has been observer at CP 500. The time-out value T is typically specified taking the respective RTT value into account. T could e.g. be set to a multiple of the determined RTT value, e.g. 4 times the RTT value.

If, it is determined at CP 500 that the TransportState variable has transitioned to the "Playing" state before expiry of time-out value T, as indicated with a conditional step 5:13, the user will be notified of a successful play out commencement of the media content on the remote MR 110, e.g. via the text message "Remote play OK", transmitted to, and displayed on UI 503, as indicated with a step 5:14.

If, on the other hand, CP 500 has not been aware of a any TransportState variable transition to the "Playing" state, before the expiry of the time out value T of the timer, e.g. prior to the elapsing of time period **4\*RTT, the play-out action is deemed to have been unsuccessfully executed at the remote MR 110, and the user will instead be notified of this fact in step 5:14, e.g. via the text message "Remote play FAILED", which in such a situation is transmitted to, and presented on UE 503**.

The proposed method can thus be used for providing a notification to a user that has initiated a play-out, indicating both when play-out problems occur, as well as indicating when a play-out is deemed to have been successfully executed.

The method described above will result in a sequence of steps which has to be executed in a control point adapted for providing the suggested notification mechanism. Such a method, according to one embodiment, will now be described in more detail, referring to the flow chart of FIG. 6.

Figure 6:
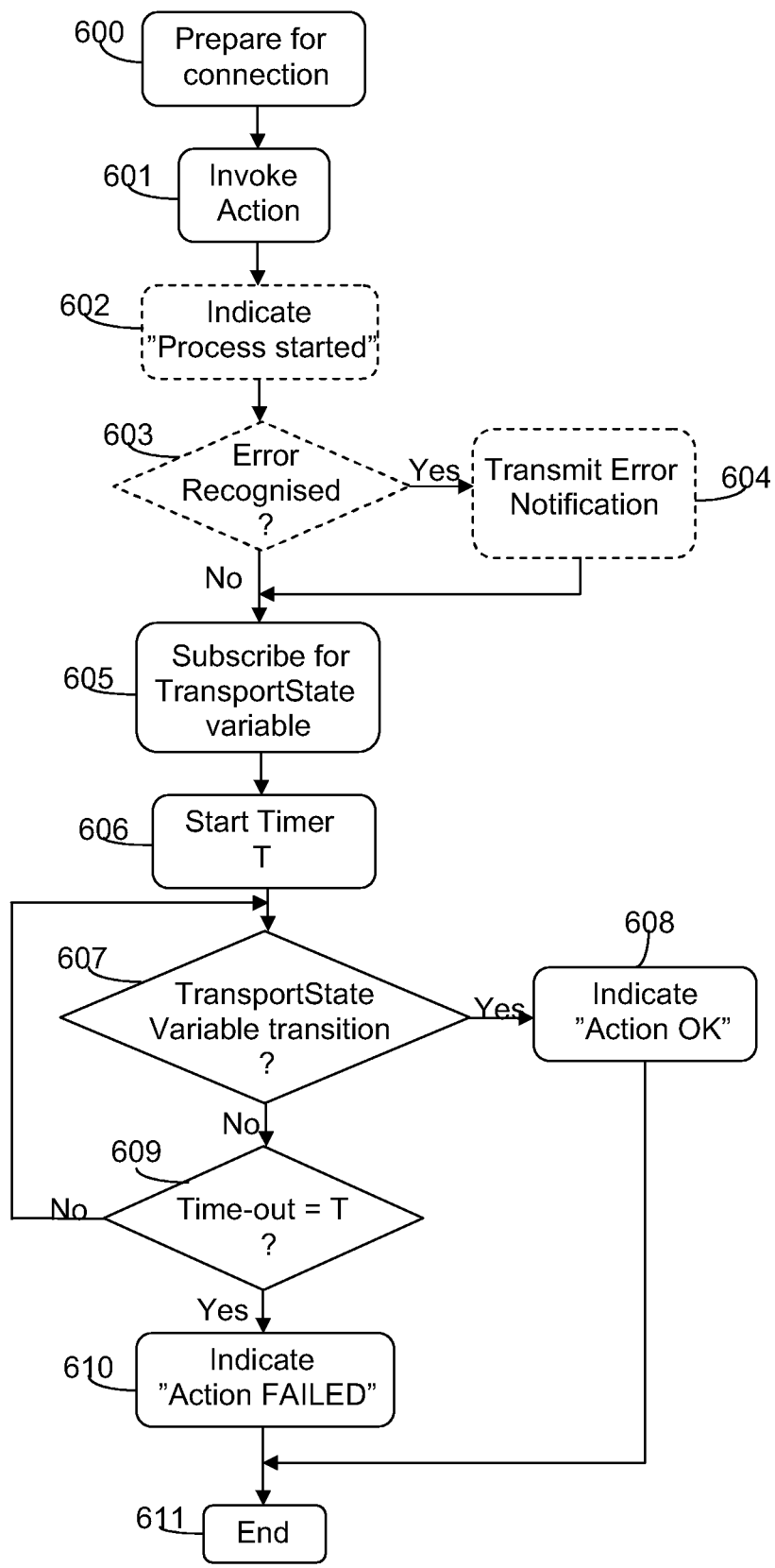
FIG. 6 is a flow chart, illustrating the notification steps to be executed by a control point performing the procedure described in FIG. 5, according to one exemplary embodiment.

In a first step 600 of FIG. 6, a UPnP CP performs the necessary preparations for establishing a remote access connection, as indicated earlier with reference to FIG. 5. As already mentioned, these preparations comprise the calculation, or retrieving of a RTT value, giving an indication of the round trip time between the media rendering device and the CP, controlling a play out procedure, between the two entities. Once the preparations have been performed, a user invokes an action via a UI integrated with the CP, or connected to the CP, as indicated in a next step 601.

In a subsequent, optional step 602, the CP notifies the user that the process has been invoked by the CP, if the CP is configured to do that. In another optional step 603, the CP may determine if there are any standardised error codes available, i.e. if the CP has received any error code in response to the play-out action invoked in step 601, and if such a code has been received, the user may be notified, either of the code, as such, or of a translation of the code, i.e. an expression of the cause of the error, provided to the user in plain text. Such a notification is indicated with optional step 604.

In a next step 605, the CP initiates a subscription for a state variable, typically the "TransportState" variable, as indicated in FIG. 5. Subsequent to the initiation of the subscription, the CP starts a timer, having a duration of time-out value T. T has typically been set to an interval which depends on the result of the RTT, retrieved in the preparation phase of step 600. This is illustrated with a step 606.

In a subsequent step 607, the subscribed variable is monitored and it is determined if a specific variable transition has been received by the CP. If it is determined that such a transition has been observed at the CP, the invoked action is deemed to have been successfully executed, and the CP will notify this to the user, as indicated in a step 608.

In a next step 609, it is determined if the time out value has expired, and if this is not the case, the monitoring at step 607 is repeated. If, however, the time out value has expired, the invoked action will instead be deemed to have failed, and the CP will instead notify the user of the failed attempt, as indicated with a step 610. The procedure terminates at step 611. Alternatively, the CP may be configured to repeat the invoking procedure once again, in case of failure to execute the invoked action.

The method described above may be applied on a standards compliant MR and MS. However, in order to be able to implement the suggested method in a UPnP AV architecture, the CP, managing the play out, and the suggested notification mechanism, has to be modified accordingly.

Figure 7:
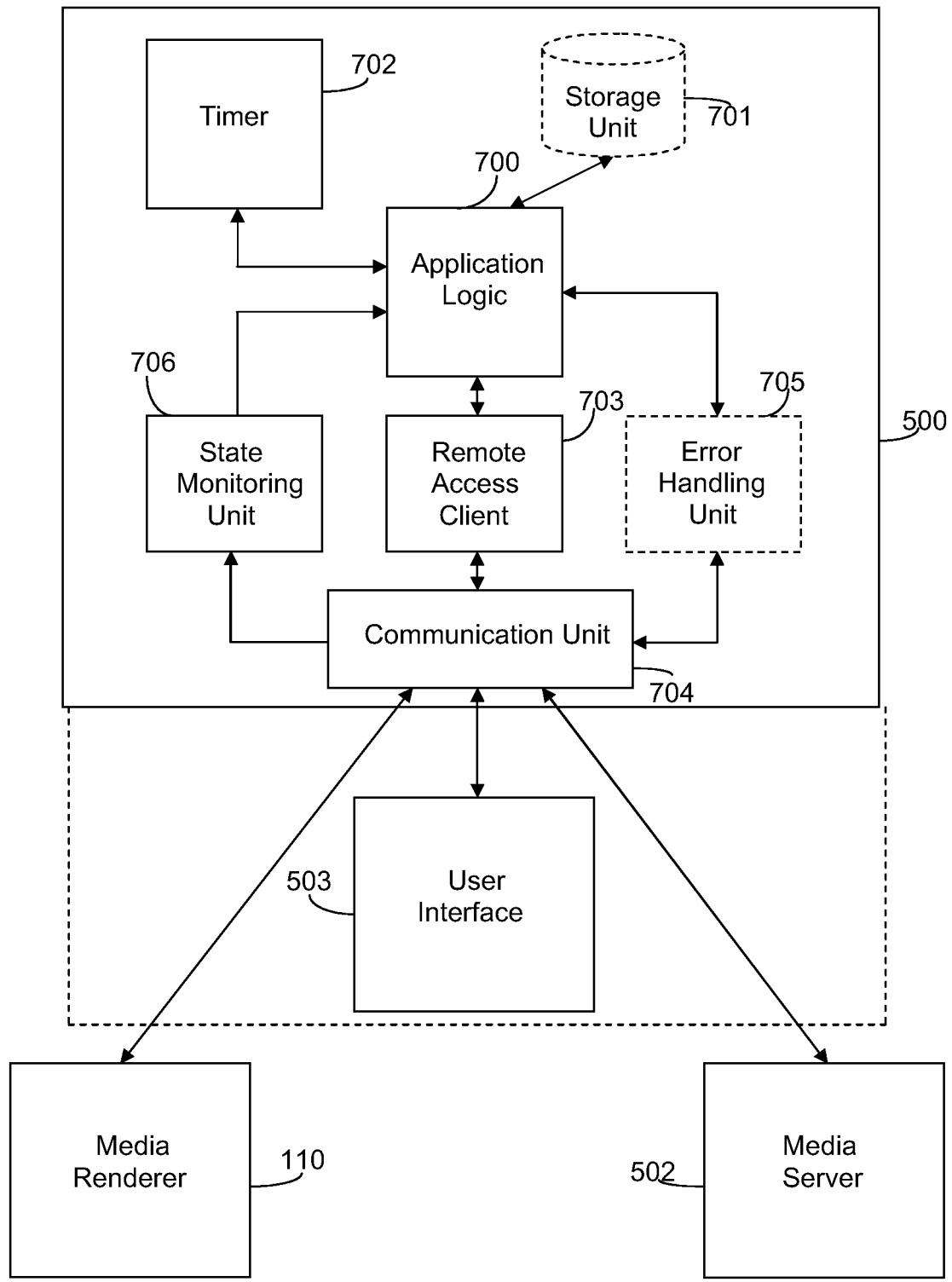
FIG. 7 is a block diagram, illustrating a control point, which is adapted to perform the notification procedure of FIGS. 5 and 6, according to one exemplary embodiment.

A remote UPnP CP, adapted to automatically execute the method described above when a user initiates a remote media content delivery procedure, according to one embodiment, will therefore now be described in more detail with reference to FIG. 7. It is to be understood that the CP of FIG. 7 only illustrates one exemplified embodiment, for configuring generic functionality which has been adapted to perform the suggested notifying mechanism, and that the presented generic functionality may also be configured in a number of alternative ways. It is also to be understood that in addition to the functionality which will be described below, a CP will also comprise additional conventional functionality which will be necessary for managing UPnP communication between a rendering device, referred to as a MR 110, a MS 502, and a UI 503. For simplicity reasons, however, any functionality which will not be necessary for the understanding of the suggested notifying mechanism, has be omitted in FIG. 7.

CP 500 comprises Application Logic 700, typically including UI application logic, which is adapted to initiate the notification mechanism described above. The notification mechanism may be configured to be initiated once a request for an action is made or received, or only in response to certain actions. The application logic 700 is adapted to execute the conventional preparation steps, in order to prepare for a communication, once such a procedure has been initiated by a user, via UI 503, or a separate UI (not shown), as well as to execute the steps necessary for determining or obtaining the RTT, as previously described. If the CP 500 is adapted to retrieve previously stored RTT values for a specific MR 110, as an alternative to calculating a RTT, CP 500 also comprises a Storage Unit 701. The Application logic 700 is also adapted to activate a subscription for a state variable from MR 110, in response to a user having invoked an action, and to start a timer 702, subsequent to having transmitted the subscription request. The CP 500 is adapted to set up a secure connection, typically a VPN connection, between CP 500 and MR 110, via a RA client 703 and a conventional communication unit 704.

The CP 500 may also comprise an Error Handling Unit 705, which is adapted to recognise error codes transmitted to CP 705 from an MR, and to manage the generation and delivery of a notification via the communication unit 704.

CP 500 also comprises a State Monitoring Unit 706, which is adapted to recognise a certain change of state for the subscribed variable. Once a changed state, provided to CP 500 from MR 110 via communication unit 704 is recognised by the monitoring unit 706, it is adapted to indicate this to the application logic 700, which is adapted to generate a respective notification, and to provide it to the user via UI 503.

While the present invention has been particularly shown and described with reference to exemplary embodiments thereof, it is to be understood by anyone of ordinary skill in the art that various changes in form of details may be made therein without departing from the spirit and scope of the present invention as defined by the following claims. Therefore it is to be understood that the above-described exemplary embodiments have been provided only in a descriptive sense and will not be construed as placing any limitation on the scope of the invention.

The proposed solution can for example be used in a non-IMS scenario, as well as in an IMS scenario. It should also be noted that the invention is not limited to the above-described specific exemplary embodiments. Although the concepts of UPnP, UPnP AV, IMS, HIGA, DLNA, the 2-box model and the 3-box model have been used in the description above, any other similar standards, protocols, devices and network elements may basically be used when providing a user notification at remote access regarding media play-out problems or successful play-out, as described herein. Moreover, the invention can be used for play-out of any type of media, thus not limited to the AV combination described according to the examples above.

Abbreviations
RA—Remote access
AV—Audio/Video
CP—Control point
DLNA—Digital Living Network Alliance
HGw—Home Gateway
HIGA—Home IMS Gateway
MR—media renderer
MS—media server
MP—media player
RGw—Residential Gateway
RTT—Round Trip Time
UPnP—Universal Plug-and-Play
VPN—Virtual Private Network

The invention claimed is:

1. A method of controlling play-out of a media content from a control point of a UPnP network, said media content being delivered from a media server to a remote rendering device, wherein the method comprises the following steps to be executed at the control point:

establishing a UPnP remote access connection between the control point and the remote rendering device;

invoking a UPnP action at the remote rendering device;

initiating a subscription of a state variable at the remote rendering device;

starting a timer, which will indicate a time that has elapsed since the initiation of the subscription;

determining a result of the UPnP action as successful when a predefined state variable transition is recognized prior to expiry of a time-out value of the timer, and the result of the UPnP action as failed when a predefined state variable transition has not been recognized upon expiry of the time-out value; and providing a notification of the result of the UPnP action to a user interface.

2. A method according to claim 1, wherein the UPnP remote access connection is a Virtual Private Network connection.

3. A method according to claim 1, wherein the control point communicates with the media server and the remote rendering device via IMS/SIP protocol.

4. A method according to claim 1, wherein prior to starting the timer, the following step is performed:

obtaining a round trip time between the remote rendering device and the control point.

5. A method according to claim 4, wherein the time-out value of the timer is set to a multiple of the round trip time.

6. A method according to claim 1, wherein subsequent to invoking the UPnP action, the following step is executed:

notifying a user that the invoked UPnP action has started at the remote rendering device.

7. A method according to claim 6, further comprising the following step:

notifying the user of an error associated with the invoked UPnP action when said action has returned an error code to the control point.

8. A method according to claim 1, wherein the invoked UPnP action is a UPnP "Play( )" action.

9. A method according to claim 1, wherein the state variable is a UPnP TransportState variable.

10. A method according to claim 1, wherein one predefined state variable transition is defined as a transition to AV Transport service "Playing" state.

11. A method according to claim 1, wherein the notification is presented to a user as any, or a combination, of:

an audio code, an audio message, a graphical symbol, or a text message.

12. A device configured to function as a control point for controlling play-out of a media content in a UPnP network, said media content being delivered from a media server to a remote rendering device, wherein the control point comprises:

a processor configured to execute the functions of:

an Application Logic unit configured to:

establish a UPnP remote access connection between the control point and the remote rendering device;

invoke a UPnP action at the media renderer;

initiate a subscription for a state variable at the rendering device; and start a timer, having a predetermined time-out value, said timer being adapted to indicate the time that has elapsed since said subscription initiation; and a state monitoring unit configured to:

recognize one or more predefined state variable transitions of the subscribed state variable when one of the one or more predefined state variable transitions occurs prior to expiry of said predetermined time-out value;

wherein the Application Logic unit is adapted to provide a notification of a successful UPnP action to a user interface when the state monitoring unit has recognized any of said one or more state variable transitions, or a notification of a failed UPnP action when none of the one or more state variable transitions has been recognized upon expiry of said time-out value.

13. The device according to claim 12, wherein the control point is established via a remote access agent.

14. The device according to claim 12, wherein the processor is further configured to execute the Application Logic unit to measure a round trip time between the media server and the remote rendering device prior to starting the timer.

15. The device according to claim 14, wherein the processor is further configured to execute the Application Logic unit to set the time-out value of the timer to a multiple of the measured round trip time.

16. The device according to claim 12, wherein the processor is further configured to execute the Application Logic unit to retrieve a round trip time between the media server and the remote rendering device from a storage device.

17. The device according to claim 16, wherein the processor is further configured to execute the Application Logic unit to set the time-out value of the timer to a multiple of the retrieved round trip time.

18. The device according to claim 12, wherein the processor is further configured to execute the functions of:

an error handling unit configured to:

recognize an error code returned from the remote rendering device in response to the UPnP action; and provide a notification associated with the error code to the user interface.

19. The device according to claim 12, wherein the device is any of:

a TV, a PC, a Laptop, a mobile telephone, or a wireless PDA.

* * * * *

UNITED STATES PATENT AND TRADEMARK OFFICE
CERTIFICATE OF CORRECTION

PATENT NO.        : 8,788,888 B2
APPLICATION NO.   : 12/921452
DATED             : July 22, 2014
INVENTOR(S)       : Damola et al.

It is certified that error appears in the above-identified patent and that said Letters Patent is hereby corrected as shown below:

On the Title Page, item (57), under "ABSTRACT", in Column 2, Line 13, delete "ors a" and insert -- or a --, therefor.

In the Specification

In Column 2, Line 35, delete "browsers" and insert -- browse --, therefor.

In Column 3, Line 43, delete "critical point" and insert -- critical points --, therefor.

In Column 4, Line 23, delete "parents" and insert -- parents' --, therefor.

In Column 4, Line 34, delete "RGw 120," and insert -- RGw, --, therefor.

In Column 7, Line 19, delete "MR 500," and insert -- MR 110, --, therefor.

In Column 7, Line 29, delete "an UPnP" and insert -- a UPnP --, therefor.

In Column 8, Line 51, delete "UE 503." and insert -- UI 503. --, therefor.

In Column 10, Line 16, delete "CP 705" and insert -- CP 500 --, therefor.

In the Claims

In Column 11, Line 16, in Claim 2, delete "A method" and insert -- The method --, therefor.

In Column 11, Line 20, in Claim 3, delete "A method" and insert -- The method --, therefor.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,788,888 B2

In Column 11, Line 23, in Claim 4, delete "A method" and insert -- The method --, therefor.

In Column 11, Line 27, in Claim 5, delete "A method" and insert -- The method --, therefor.

In Column 11, Line 29, in Claim 6, delete "A method" and insert -- The method --, therefor.

In Column 11, Line 33, in Claim 7, delete "A method" and insert -- The method --, therefor.

In Column 11, Line 38, in Claim 8, delete "A method" and insert -- The method --, therefor.

In Column 11, Line 40, in Claim 9, delete "A method" and insert -- The method --, therefor.

In Column 11, Line 42, in Claim 10, delete "A method" and insert -- The method --, therefor.

In Column 11, Line 45, in Claim 11, delete "A method" and insert -- The method --, therefor.